US010135562B2

(12) United States Patent
Zhang et al.

(10) Patent No.: US 10,135,562 B2
(45) Date of Patent: Nov. 20, 2018

(54) APPARATUS AND METHOD FOR LINK ADAPTATION IN UPLINK GRANT-LESS RANDOM ACCESS

(71) Applicant: Huawei Technologies Co., Ltd., Shenzhen (CN)

(72) Inventors: Liqing Zhang, Ottawa (CA); Kelvin Kar Kin Au, Kanata (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 52 days.

(21) Appl. No.: 14/724,569

(22) Filed: May 28, 2015

(65) Prior Publication Data

US 2016/0352454 A1 Dec. 1, 2016

(51) Int. Cl.
*H04L 1/00* (2006.01)
*H04L 5/00* (2006.01)
*H04W 74/08* (2009.01)

(52) U.S. Cl.
CPC .......... *H04L 1/0003* (2013.01); *H04L 1/0009* (2013.01); *H04L 1/0025* (2013.01);
(Continued)

(58) Field of Classification Search
CPC ... H04L 1/0002; H04L 1/0003; H04L 1/0009; H04L 1/0015; H04L 1/0016;
(Continued)

(56) References Cited

U.S. PATENT DOCUMENTS 6,307,865 B1 * 10/2001 Ogasawara ........ H04N 1/00106
370/337
6,377,817 B1 * 4/2002 Hakaste ................ H04L 1/0003
370/252
(Continued)

FOREIGN PATENT DOCUMENTS

CA         2931664 A1 * 7/2015 .......... H04W 72/042
CN      101207461 A    6/2008
(Continued)

OTHER PUBLICATIONS

Mohammed, S., et al., "Constant-Envelope Multi-User Precoding for Frequency-Selective Massive MIMO Systems," IEEE Wireless Communications Letters, vol. 2, No. 5, Oct. 2013, pp. 547-550.
(Continued)

*Primary Examiner* — Eric Nowlin
(74) *Attorney, Agent, or Firm* — Slater Matsil, LLP

(57) ABSTRACT

Embodiments are provided for a scheme of link adaptation (LA) in uplink grant-less random access (RA) communications. The scheme includes changing a modulation and coding (MCS) of a user, instead of using a fixed MCS over time, as the user link, channel, or non-link conditions vary during the RA communications. In an embodiment, a transmission point (TP) receives from a UE a packet encoded using a MCS, and detects a condition associated with uplink measurements or other non-link based condition of the UE. The TP then initiates an upgrade or a downgrade of the MCS in accordance with the condition, and signals the UE indicating a second MCS as a result. The UE thus sends a second packet encoded using the second MCS. In another embodiment, the UE initiates the MCS change in accordance to detecting a link or non-link based condition, such as change of mobility.

53 Claims, 6 Drawing Sheets

(52) U.S. Cl.
CPC ............ *H04L 5/006* (2013.01); *H04L 5/0057* (2013.01); *H04L 1/0016* (2013.01); *H04W 74/0833* (2013.01)

(58) Field of Classification Search
CPC ... H04L 1/0021; H04L 1/0022; H04L 1/0026; H04L 5/0057; H04L 5/006; H04L 25/4917; H04L 1/0025; H04W 74/0833; H04B 1/0475
See application file for complete search history.

(56) References Cited

U.S. PATENT DOCUMENTS

| | | | | |
|---|---|---|---|---|
| 6,587,697 B2 * | 7/2003 | Terry | H04W 52/146 | 455/522 |
| 6,782,269 B2 * | 8/2004 | Toskala | H04W 28/22 | 370/335 |
| 7,366,464 B2 * | 4/2008 | Iacono | H04W 16/24 | 455/115.1 |
| 7,558,289 B1 * | 7/2009 | Bidichandani | H04W 28/06 | 370/466 |
| 7,613,157 B2 * | 11/2009 | Pan | H04W 72/1289 | 370/277 |
| 7,613,475 B2 * | 11/2009 | Song | H04W 52/325 | 370/338 |
| 7,702,031 B2 * | 4/2010 | Dunn | H04L 1/0025 | 375/295 |
| 7,729,373 B2 * | 6/2010 | Dale | H04N 7/17309 | 370/462 |
| 7,898,948 B2 * | 3/2011 | DiGirolamo | H04L 1/0026 | 370/230 |
| 8,077,782 B2 * | 12/2011 | Onodera | H04L 25/022 | 375/259 |
| 8,185,064 B2 * | 5/2012 | Nogami | H04L 1/0003 | 370/212 |
| 8,248,981 B2 * | 8/2012 | Warner | H04B 1/713 | 370/311 |
| 8,488,461 B2 * | 7/2013 | Pan | H04L 47/283 | 370/232 |
| 8,559,943 B2 * | 10/2013 | Bidichandani | H04W 28/06 | 370/229 |
| 8,582,522 B2 * | 11/2013 | Earnshaw | H04L 1/1887 | 370/310 |
| 8,724,556 B2 * | 5/2014 | McCoy | H04W 72/1284 | 370/230 |
| 8,868,125 B2 * | 10/2014 | Bonneville | H04W 52/0206 | 455/525 |
| 8,971,256 B2 * | 3/2015 | Bracha | H04W 74/0808 | 370/329 |
| 9,026,051 B2 * | 5/2015 | Etemad | H04W 76/14 | 455/41.2 |
| 9,137,813 B2 * | 9/2015 | Terry | H04W 52/146 | |
| 9,178,666 B2 * | 11/2015 | Park | H04L 1/1887 | |
| 9,210,699 B2 * | 12/2015 | McCoy | H04W 72/1284 | |
| 9,391,914 B2 * | 7/2016 | Van Wyk | H04W 28/065 | |
| 9,420,530 B1 * | 8/2016 | Duxbury | H04W 52/0206 | |
| 9,444,662 B2 * | 9/2016 | Imamura | H04L 25/4902 | |
| 9,485,776 B2 * | 11/2016 | Park | H04L 1/1887 | |
| 9,609,520 B2 * | 3/2017 | Shellhammer | H04W 16/14 | |
| 9,736,774 B2 * | 8/2017 | Au | H04W 52/0209 | |
| 9,743,423 B2 * | 8/2017 | Liu | H04W 72/1268 | |
| 9,750,056 B2 * | 8/2017 | Au | H04W 74/0841 | |
| 9,806,932 B2 * | 10/2017 | Zhang | H04L 27/3488 | |
| 9,883,404 B2 * | 1/2018 | Malladi | H04W 16/14 | |
| 9,967,900 B2 * | 5/2018 | He | H04W 74/06 | |
| 9,979,527 B2 * | 5/2018 | Jhang | H04L 5/0055 | |
| 2002/0168944 A1 * | 11/2002 | Terry | H04L 1/0009 | 455/67.11 |
| 2002/0168994 A1 * | 11/2002 | Terry | H04W 52/146 | 455/522 |
| 2003/0232601 A1 * | 12/2003 | Uno | H04L 25/0204 | 455/67.11 |
| 2003/0232624 A1 * | 12/2003 | Toskala | H04W 28/22 | 455/509 |
| 2004/0038697 A1 * | 2/2004 | Attar | H04W 52/12 | 455/522 |
| 2004/0103278 A1 * | 5/2004 | Abhishek | H04L 63/08 | 713/160 |
| 2004/0185788 A1 * | 9/2004 | Terry | H04L 1/0009 | 455/67.11 |
| 2004/0185789 A1 * | 9/2004 | Terry | H04L 1/0009 | 455/67.11 |
| 2005/0002366 A1 * | 1/2005 | Toskala | H04W 28/22 | 370/338 |
| 2005/0025254 A1 * | 2/2005 | Awad | H04L 1/0003 | 375/295 |
| 2005/0047366 A1 | 3/2005 | Ghosh et al. | | |
| 2005/0159166 A1 * | 7/2005 | Jonsson | H04W 28/24 | 455/452.2 |
| 2005/0169391 A1 * | 8/2005 | Takeda | H04L 1/0003 | 375/259 |
| 2005/0195908 A1 * | 9/2005 | Dunn | H04L 1/0025 | 375/260 |
| 2005/0250528 A1 * | 11/2005 | Song | H04W 52/32 | 455/522 |
| 2005/0285803 A1 * | 12/2005 | Iacono | H04W 16/24 | 343/702 |
| 2006/0009229 A1 * | 1/2006 | Yuan | H04W 72/14 | 455/452.1 |
| 2006/0107164 A1 * | 5/2006 | Baer | H04L 1/0002 | 714/748 |
| 2007/0066242 A1 * | 3/2007 | Yi | H04L 1/0003 | 455/69 |
| 2007/0293276 A1 * | 12/2007 | Ushijima | H04M 19/04 | 455/567 |
| 2008/0004032 A1 * | 1/2008 | Lironi | H04L 1/0002 | 455/452.2 |
| 2008/0095185 A1 * | 4/2008 | DiGirolamo | H04L 1/0026 | 370/464 |
| 2008/0137562 A1 * | 6/2008 | Li | H04B 7/2656 | 370/280 |
| 2008/0159431 A1 * | 7/2008 | Obuchi | H04B 7/0452 | 375/267 |
| 2008/0233964 A1 * | 9/2008 | McCoy | H04W 72/1284 | 455/450 |
| 2009/0023392 A1 * | 1/2009 | Iizuka | H04B 1/7113 | 455/65 |
| 2009/0103483 A1 * | 4/2009 | Higuchi | H04L 5/0005 | 370/329 |
| 2009/0232082 A1 * | 9/2009 | Bidichandani | H04W 28/06 | 370/329 |
| 2009/0239560 A1 * | 9/2009 | Nakamura | H04L 27/0008 | 455/500 |
| 2009/0258665 A1 * | 10/2009 | Bourlas | H04L 1/0003 | 455/522 |
| 2010/0009689 A1 * | 1/2010 | Jalloul | H04L 1/0003 | 455/450 |
| 2010/0023830 A1 * | 1/2010 | Wengerter | H04L 1/0025 | 714/748 |
| 2010/0265895 A1 * | 10/2010 | Bracha | H04W 74/0808 | 370/329 |
| 2010/0309793 A1 * | 12/2010 | Choi | H04L 1/0016 | 370/252 |
| 2011/0064167 A1 * | 3/2011 | Rezk | H04B 7/0413 | 375/340 |
| 2011/0070836 A1 * | 3/2011 | Park | H04L 1/1887 | 455/41.2 |
| 2011/0176464 A1 * | 7/2011 | Warner | H04B 1/713 | 370/311 |
| 2011/0222415 A1 | 9/2011 | Ramamurthi et al. | | |
| 2011/0243080 A1 | 10/2011 | Chen et al. | | |
| 2011/0255469 A1 | 10/2011 | Kishiyama et al. | | |
| 2011/0274054 A1 * | 11/2011 | Cordeiro | H04L 1/0015 | 370/329 |
| 2011/0310800 A1 * | 12/2011 | Lin | H04W 28/14 | 370/328 |
| 2012/0014269 A1 * | 1/2012 | Ray | H04W 74/006 | 370/252 |

(56) References Cited

U.S. PATENT DOCUMENTS

| | | | | |
|---|---|---|---|---|
| 2012/0020281 A1* | 1/2012 | Nakamura | H04L 1/0021 | 370/328 |
| 2012/0088531 A1* | 4/2012 | Bonneville | H04W 52/0206 | 455/500 |
| 2012/0157141 A1* | 6/2012 | Lim | H04W 74/08 | 455/509 |
| 2012/0170514 A1* | 7/2012 | Lo | H04W 52/262 | 370/328 |
| 2013/0016670 A1* | 1/2013 | Shellhammer | H04W 16/14 | 370/329 |
| 2013/0083737 A1* | 4/2013 | Earnshaw | H04L 1/1887 | 370/329 |
| 2013/0142038 A1* | 6/2013 | Pan | H04L 47/25 | 370/230 |
| 2013/0148611 A1* | 6/2013 | Moulsley | H04B 7/024 | 370/329 |
| 2013/0163535 A1* | 6/2013 | Anderson | H04W 72/04 | 370/329 |
| 2013/0182592 A1* | 7/2013 | Calcev | H04W 24/10 | 370/252 |
| 2014/0036808 A1* | 2/2014 | Pelletier | H04W 72/14 | 370/329 |
| 2014/0079005 A1* | 3/2014 | McCoy | H04W 72/1284 | 370/329 |
| 2014/0094122 A1* | 4/2014 | Etemad | H04W 76/14 | 455/41.2 |
| 2014/0122956 A1* | 5/2014 | Yun | H04L 1/1829 | 714/748 |
| 2014/0169195 A1* | 6/2014 | Hsin | H04W 72/085 | 370/252 |
| 2014/0192732 A1 | 7/2014 | Chen et al. | | |
| 2014/0192767 A1* | 7/2014 | Au | H04W 72/0413 | 370/330 |
| 2014/0254544 A1* | 9/2014 | Kar Kin Au | H04L 5/0033 | 370/330 |
| 2014/0321292 A1* | 10/2014 | Yokoyama | H04L 1/0003 | 370/242 |
| 2014/0362780 A1* | 12/2014 | Malladi | H04W 16/14 | 370/329 |
| 2015/0078256 A1* | 3/2015 | Van Wyk | H04L 47/365 | 370/328 |
| 2015/0195788 A1* | 7/2015 | Au | H04W 52/0251 | 370/311 |
| 2015/0195819 A1* | 7/2015 | Kwon | H04W 72/042 | 370/329 |
| 2015/0326415 A1* | 11/2015 | Imamura | H04L 25/4902 | 375/238 |
| 2016/0029400 A1* | 1/2016 | Park | H04L 1/1887 | 370/329 |
| 2016/0057735 A1* | 2/2016 | Liu | H04L 1/0003 | 370/329 |
| 2016/0057747 A1* | 2/2016 | Jhang | H04L 5/0055 | 370/329 |
| 2016/0135211 A1* | 5/2016 | Panigrahi | H04W 4/70 | 370/329 |
| 2016/0142292 A1* | 5/2016 | Au | H04L 5/0007 | 370/352 |
| 2016/0156673 A1* | 6/2016 | Emmanuel | H04W 16/14 | 370/338 |
| 2016/0182183 A1* | 6/2016 | Wang | H04L 1/0001 | 455/423 |
| 2016/0219627 A1* | 7/2016 | Au | H04W 74/0841 | |
| 2016/0227481 A1* | 8/2016 | Au | H04W 52/0209 | |
| 2016/0262170 A1* | 9/2016 | Lee | H04W 16/14 | |
| 2016/0269212 A1* | 9/2016 | Vilaipornsawai | H04L 27/2627 | |
| 2016/0269218 A1* | 9/2016 | Zhang | H04L 27/3488 | |
| 2016/0270102 A1* | 9/2016 | Zeng | H04W 72/1231 | |
| 2016/0323911 A1* | 11/2016 | Au | H04L 5/0033 | |
| 2016/0352454 A1* | 12/2016 | Zhang | H04L 1/0003 | |
| 2016/0353374 A1* | 12/2016 | Hoglund | H04W 52/0209 | |
| 2016/0353453 A1* | 12/2016 | Au | H04W 74/006 | |
| 2016/0381368 A1* | 12/2016 | Liao | H04N 19/164 | 375/240.26 |
| 2017/0026976 A1* | 1/2017 | Yoo | H04L 1/0057 | |
| 2017/0034845 A1* | 2/2017 | Liu | H04L 1/0003 | |
| 2017/0034847 A1* | 2/2017 | He | H04W 74/06 | |
| 2017/0070793 A1* | 3/2017 | Liu | H04Q 9/00 | |
| 2017/0078003 A1* | 3/2017 | Ghosh | H04W 74/04 | |
| 2017/0127435 A1* | 5/2017 | Rong | H04W 72/1215 | |
| 2017/0215181 A1* | 7/2017 | McCoy | H04W 72/0413 | |
| 2017/0223712 A1* | 8/2017 | Stephens | H04W 72/08 | |
| 2017/0245140 A1* | 8/2017 | Au | H04W 8/22 | |
| 2017/0257195 A1* | 9/2017 | Maaref | H04L 5/0007 | |
| 2017/0272963 A1* | 9/2017 | Rengarajan | H04W 24/02 | |
| 2017/0288817 A1* | 10/2017 | Cao | H04L 1/08 | |
| 2017/0289968 A1* | 10/2017 | Marco | H04W 72/042 | |
| 2017/0290052 A1* | 10/2017 | Zhang | H04W 74/004 | |
| 2017/0310431 A1* | 10/2017 | Iyer | H04L 1/1861 | |
| 2017/0311182 A1* | 10/2017 | Tenny | H04W 76/27 | |
| 2017/0311278 A1* | 10/2017 | Adjakple | H04W 64/00 | |
| 2017/0318530 A1* | 11/2017 | Au | H04W 52/0209 | |
| 2017/0318598 A1* | 11/2017 | Islam | H04W 72/04 | |
| 2017/0318604 A1* | 11/2017 | Liu | H04W 28/0289 | |
| 2018/0027452 A1* | 1/2018 | Tanaka | H04W 28/18 | 370/329 |
| 2018/0027582 A1* | 1/2018 | Yerramalli | H04W 72/1268 | |
| 2018/0035331 A1* | 2/2018 | Sundman | H04W 4/70 | |
| 2018/0035406 A1* | 2/2018 | Hao | H04W 72/02 | |
| 2018/0102865 A1* | 4/2018 | Li | H04J 14/0212 | |
| 2018/0103487 A1* | 4/2018 | Asterjadhi | H04W 74/002 | |
| 2018/0115934 A1* | 4/2018 | Chen | H04W 36/18 | |

FOREIGN PATENT DOCUMENTS

| | | | | |
|---|---|---|---|---|
| CN | 104243104 A | | 12/2014 | |
| CN | 104507170 A | | 4/2015 | |
| EP | 3092762 A1 * | 11/2016 | | H04W 72/042 |
| EP | 3200370 A1 * | 8/2017 | | H04W 76/10 |
| EP | 3200370 A4 * | 10/2017 | | H04W 76/10 |
| EP | 3266242 A1 * | 1/2018 | | H04L 1/00 |
| RU | 2013151005 A | | 5/2015 | |
| WO | 03003643 A1 | | 1/2003 | |
| WO | WO-2011120443 A1 * | 10/2011 | | H04W 74/0841 |
| WO | WO-2012088579 A1 * | 7/2012 | | H04W 52/241 |
| WO | WO2018032014 A1 * | 8/2012 | | H04W 74/08 |
| WO | WO-2012088579 A8 * | 8/2013 | | H04W 52/241 |
| WO | 2014047773 A1 | | 4/2014 | |
| WO | WO-2014135126 A1 * | 9/2014 | | H04L 5/0033 |
| WO | WO-2014147479 A2 * | 9/2014 | | H04L 1/0003 |
| WO | WO-2015103630 A1 * | 7/2015 | | H04W 72/042 |
| WO | WO-2015131727 A1 * | 9/2015 | | H04W 76/10 |
| WO | WO-2016140602 A1 * | 9/2016 | | H04L 1/00 |
| WO | WO-2016186540 A1 * | 11/2016 | | H04W 74/0808 |

OTHER PUBLICATIONS

Rahmatallah, Y., et al., "Peak-To-Average Power Ratio Reduction in OFDM Systems: A Survey and Taxonomy," IEEE Communications Surveys & Tutorials, vol. 15, No. 4, Fourth Quarter 2013, pp. 1567-1592.

Studer, C., et al., PAR-Aware Multi-User Precoder for the Large-Scale MIMO-OFDM Downlink, 2012 International Symposium on Wireless Communication Systems (ISWCS), Aug. 28-31, 2012, pp. 806-810.

Ramamurthi, V. et al., "Mobility Based MIMO Link Adaptation in LTS-Advanced Cellular Networks", International Conference on Broadband, Wireless Computing, Communications and Applications, Nov. 2010, 7 pages.

Sun, Q et al., "Software Defined Air Interface: A Framework of 5G Air Interface", 2015 IEEE Wireless Communications and Networking Conference (WCNC)—Workshops—5G Architecture, Mar. 2015 , 6 Pages, New Orleans, LA.

Taherzadeh, M et al., "SCMA Codebook Design", 2014 IEEE 80th Vehicular Technology Conference, Sep. 2014, 5 pages, Vancouver, BC, Canada.

* cited by examiner

APPARATUS AND METHOD FOR LINK ADAPTATION IN UPLINK GRANT-LESS RANDOM ACCESS

TECHNICAL FIELD

The present invention relates to wireless communications, and, in particular embodiments, to an apparatus and method for link adaptation in uplink grant-less random access.

BACKGROUND

In evolving and next generation wireless networks, an uplink grant-less random access (RA) scheme can be employed to reduce signaling overhead and support traffic and applications with stringent latency requirements. For example, for applications such as gaming, or real time video streaming, real-time streams require very low latency and reliable transmissions. For the random access scheme in uplink, sparse-code-multiple access (SCMA) technology can be used for overloading traffic where multiple users can share the same radio resources simultaneously. A fixed modulation and coding scheme (MCS) such as Quadrature Phase Shift Keying (QSPK) is also used in order to achieve more reliable communications. In many conventional Radio Access Networks (RANs), a random access channel is used by a terminal to request a scheduled transmission slot. As a result, communications over the random access channel tend to be very short, and use of a robust MCS is favored to afford a maximum likelihood of transmission success. There has been increased interest in the use of the random access channels for data transmissions. However, the use of a very robust MCS may not always be necessary, and when it is not necessary it contributes to a reduction in the efficient use of the spectrum. At present, there is no mechanism to allow for increased efficiency in the random access data communication. To support more users, more aggressive modulation and coding schemes (MCSs) may be beneficial for user equipment (UE) such as when the UE has proper channel conditions or location/geometry in the network. Therefore, there is a need for a link adaptation (LA) scheme for uplink grant-less RA according to such conditions.

SUMMARY

In accordance with an embodiment, a method for random access link adaptation in wireless networks includes receiving, by a transmission point (TP) from a user equipment (UE), a first packet encoded using a modulation and coding scheme (MCS) pre-assigned for the UE, and detecting a link adaptation (LA) condition associated with uplink long-term (LT) measurements of the UE upon receiving the first packet. The method further includes performing one of an upgrade and a downgrade of the MCS for contention based grant-less transmission in accordance with the LA condition, and signaling the UE indicating a second MCS as a result of the upgrade or downgrade. A second packet encoded using the second MCS is then received from the UE.

In accordance with another embodiment, a method for random access link adaptation in wireless networks includes transmitting, by a UE to a TP, a first packet encoded using a first MCS pre-assigned for the UE, detecting a LA condition associated with UE transmission or application quality upon receiving the first packet, and initiating a downgrade of the first MCS for contention based grant-less transmission in accordance with the LA condition. The method further includes receiving, from the TP, a signaling indicating a second MCS as a result of the downgrade. The second MCS is a more robust MCS than the first MCS. A second packet encoded using the second MCS is then sent to the TP.

In accordance with another embodiment, a network component comprises at least one processor and a non-transitory computer readable storage medium storing programming for execution by the at least one processor. The programming includes instructions to receive from a UE, a first packet encoded using a MCS, detect a LA condition associated with an uplink measurement of the UE upon receiving the first packet, and perform one of an upgrade and a downgrade of the MCS in accordance with the LA condition. The programming includes further instructions to signal the UE indicating a second MCS as a result of the upgrade or downgrade, and receive, from the UE, a second packet encoded using the second MCS.

In accordance with another embodiment, a UE comprises at least one processor and a non-transitory computer readable storage medium storing programming for execution by the at least one processor. The programming includes instructions to transmit, to a TP, a first packet encoded using a first MCS, detect a LA condition associated with the UE upon receiving the first packet, and initiate a downgrade of the first MCS in accordance with the LA condition. The programming includes further instructions to receive, from the TP, a signaling indicating a second MCS as a result of the downgrade, wherein the second MCS is a more robust MCS than the first MCS, and send, to the UE, a second packet encoded using the second MCS.

In accordance with yet another embodiment, a method performed at a node participating in a grant free wireless communication where an entity uses a MCS for transmissions includes determining, in accordance with a non-link based factor, to switch from a current MCS to a new MCS, and instructing a grant free transmission controller to use the new MCS for subsequent grant free transmissions.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

System and method embodiments are provided herein for a scheme of link adaptation in uplink grant-less random access (RA). The scheme includes changing the MCS assigned to a user equipment (UE), instead of using a fixed MCS scheme (e.g., typically a robust one such as QSPK), as the UE link/channel conditions vary during the RA communications. The methods and systems disclosed herein perform link adaptation based on uplink measurements and long-term measurements of signal quality for a UE. As used herein, the term UE represents any device capable of connecting to a wireless network, including user operated devices (e.g., smartphones) and machine-to-machine communications (M2M) devices such as sensor devices. The UE starts transmissions with a defined robust MCS, and after the channel has demonstrated sufficient signal quality, e.g., according to predefined thresholds and criteria, a less robust MCS is applied. This process of channel evaluation and application of successively less robust MCS can be repeated until a sufficiently robust MCS is selected. This iterative process is referred to herein as slow link adaptation (LA). To obtain channel measurements, a channel quality indicator (CQI) value on the uplink (UL) channel associated with the UE can be measured by a transmission point (TP), e.g., a base station (BS) or evolved node-B (eNB). Power control for RA can also be used for grant-less scheduling. The TP modifies the MCS for the UE, as needed according to various criteria and scenarios, based on long-term Power Control (PC), and notifies the UE of such change. The adaptation can also be carried out so that it provides support of stout channel (SC) and retransmission (ReTx) protocol for more efficient retransmission and UE detection for grant-less RA communications. The MCS can be upgraded (by switching to less robust MCS suitable for better signal quality conditions) and downgraded (by switching to more robust MCS or reverting to the initial most robust MCS), e.g., according to user/link/overall network conditions, to guarantee reliable RA data communications. This can be performed periodically by the TP or network. Alternatively, the UE can downgrade its MCS without signaling. The LA scheme can increase spectrum efficiency, support more users, and/or reduce latency, when possible.

Figure 1:
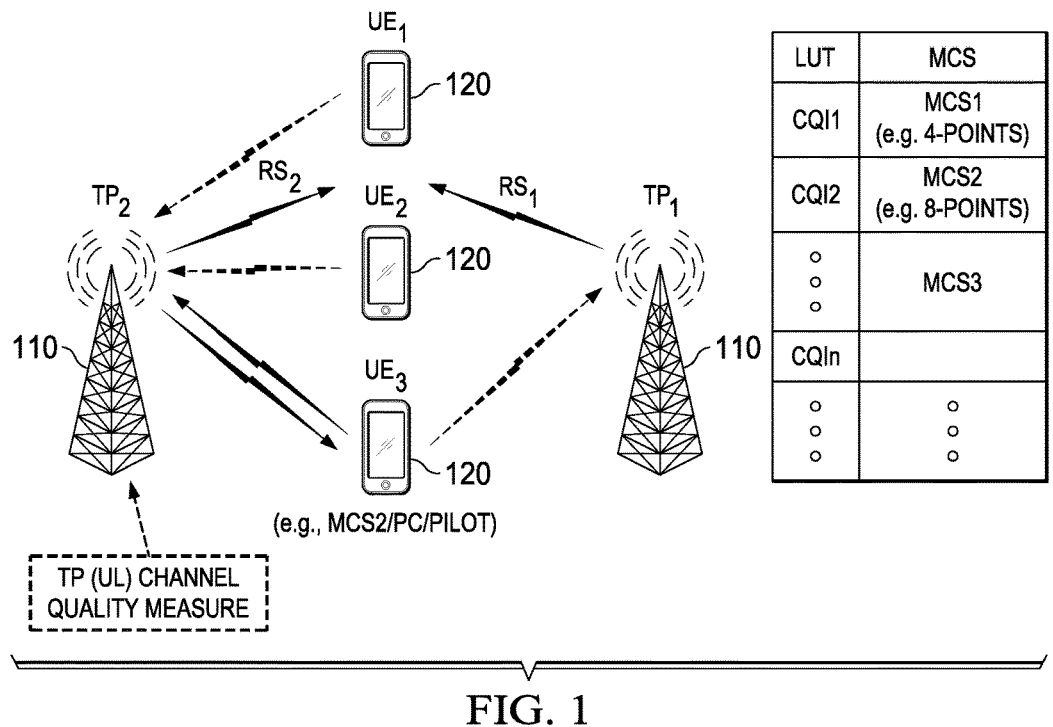
FIG. 1 shows an embodiment of LA with network terminal point (TP) operations.

FIG. 1 shows an embodiment of LA in UL grant-less RA with TP operations. Specifically, the TP performs UL based measurement for the UE and controls MCS accordingly. TP1 110 can measure interference generated by UEs 120 connected to TP1, as well as interference caused by transmissions between UEs 120 and other TPs, such as TP2 110. Neighboring TPs can also exchange this information with each other, either directly or through a third party. A TP 110 also measures the UL signal quality of the UEs linked to, or within a detection range of, the TP 110. The measurement can be performed, e.g., for initial access, sounding reference signal (SRS), or other signal quality indicators. The TP 110 can also measure the linked or close by UE's mobility and location. The UEs 120 are then categorized accordingly to such measures. For instance, fast-moving UEs 120 can be assigned a fixed MCS, e.g., QSPK, while static and/or slow moving UEs 120 are set for the LA scheme with changing MCS. A TP 110 also performs PC on a neighboring UE 120 based on long-term (LT) measurements, e.g., LT UL signal quality, LT UE mobility, LT UE location, or others.

Additionally, the TPs 110 or a network management entity can establish a LT MCS look-up table (LUT). The LT MCS LUT can be generated at the TPs or by a central controller at the network that forwards the LUT or its values to the TPs. The LT MCS LUT may include substantially fewer entries than used for short term LA. To establish the MCS LUT, a TP 110 estimates multiple CQI values based on PC strategy, and associates each CQI value with a suitable MCS. Each CQI value and its MCS can be added as an entry, e.g., a row value, in the LUT. Each entry in the LUT corresponds to an association between a CQI value and a MCS. This determines the strategy for selecting MCS for a UE 120 based on its measured CQI. During on-going communications, the TP/network uses the LUT to select the appropriate MCS for a UE 120 based on its measured CQI. For example, the UE 120 is assigned MCS1 at CQI1 measured levels, and is then upgraded to MCS2 when the CQI changes from CQI1 to CQI2. With similar logic, the UE 120 can be downgraded from MCS2 to MCS1 according to the measured changes in CQI levels. UE MCS upgrade and downgrade can be based on UE long-term measurement in the uplink and categorization of the UEs based on such measurements. For example, according to the measurement values, the UEs can be categorized as fast-moving (or high mobility) UEs, slow moving (or low mobility) UEs, or static UEs. Similarly, pilot adjustment as needed is also an option to provide better channel measurements at TP. The upgrade and downgrade may be achieved via TP signaling to the UEs 120. Radio Resource Control (RRC) signaling can be used for UE grouping and RA resource allocation. The signaling instructing an upgrade or downgrade may indicate a new MCS to switch to, the transmission power and optionally pilot reselection. The upgrade or downgrade of UE MCS based on the UL LT measurement may also be performed periodically.

Figure 2:
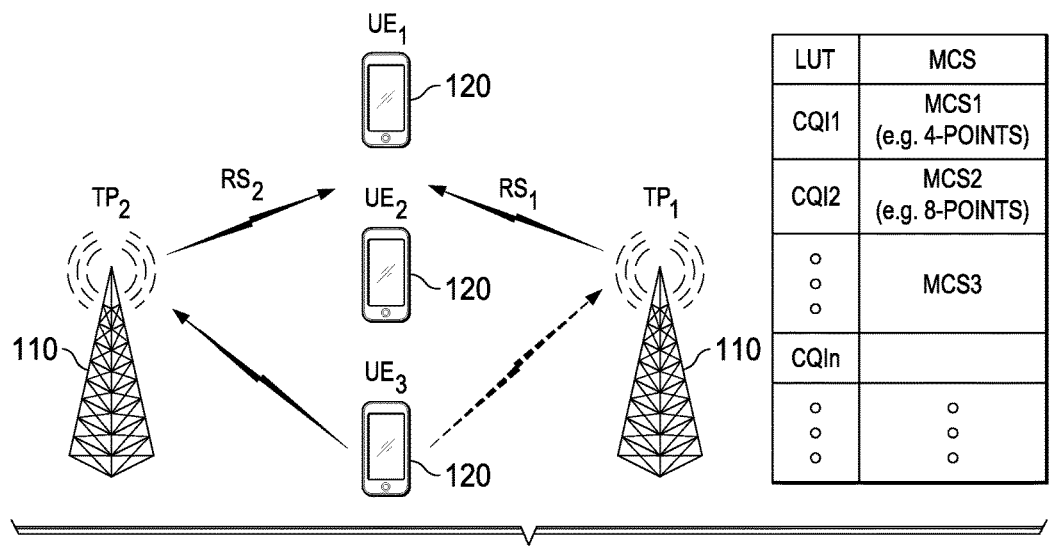
FIG. 2 shows an embodiment of LA with UE operations.

FIG. 2 shows an embodiment of LA in UL grant-less RA with UE operations. A UE 120 in the wireless system obtains resource allocation information, e.g., via RRC signaling, when UE power is on. During initial data access, the UE 120 can adjust the transmission power based on an outer loop power control (OLPC) scheme. The packet transmission can also be carried with the most robust MCS supported by the system. When a failed transmission is detected, the previous transmission is retransmitted in accordance with a ReTx protocol. The UE 120 can also perform MCS downgrade without signaling a neighboring TP 110/network in scenarios such as when unexpected events occur to the UE 110. For example, a static/slow-moving UE 110 with a higher MCS can initiate a MCS downgrade when the UE 110 determines that it has started to move at a faster speed but a neighboring or other TP 110 has no timely information of the UE. In another example scenario, a UE 120 with higher MCS can downgrade MCS for certain traffic/application that requires higher reliability. In yet another scenario, a UE 120 with higher MCS can go downgrading MCS before its maximum retransmission times are reached.

Figure 3:
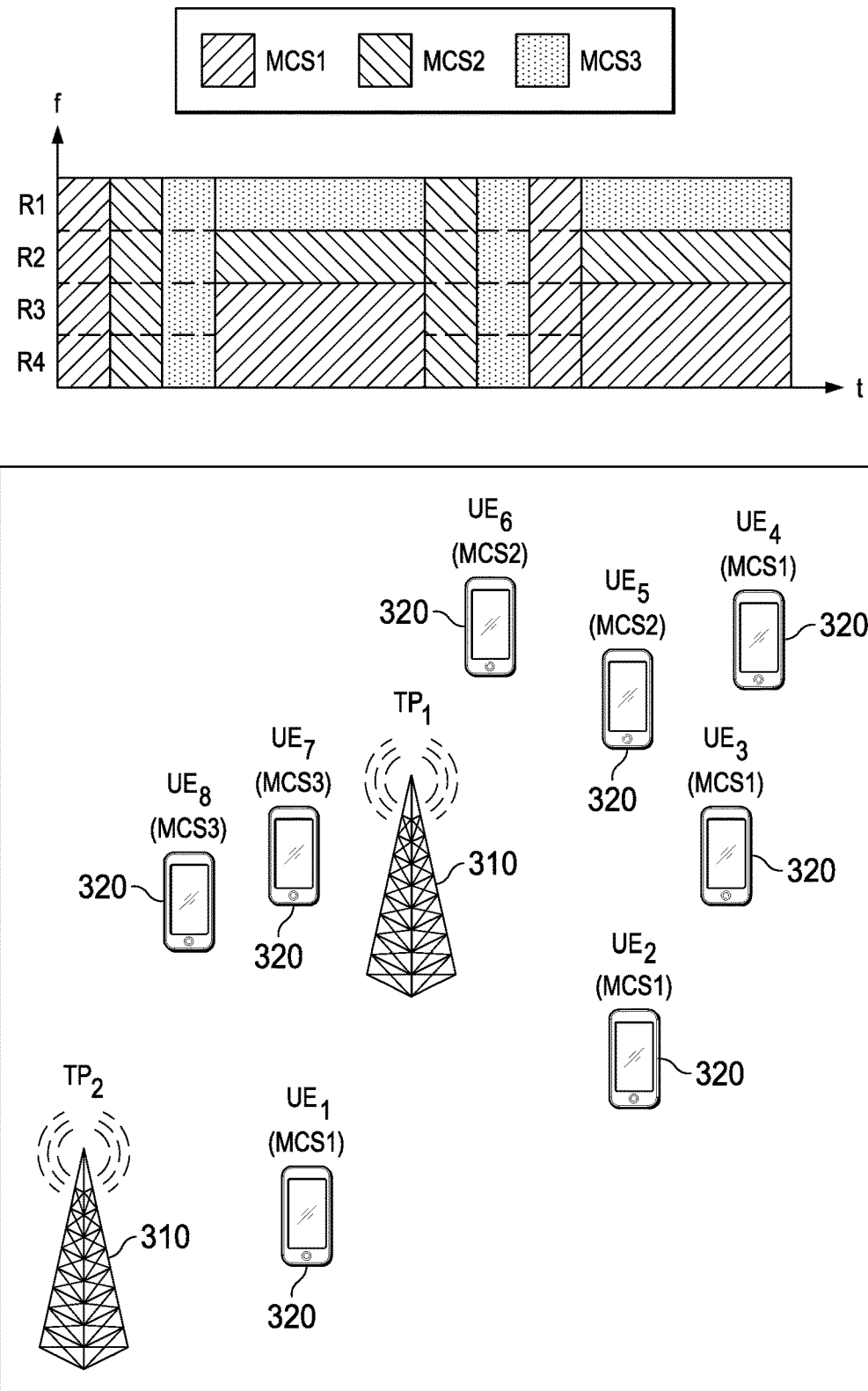
FIG. 3 shows an embodiment of UE RA resource allocation.

FIG. 3 shows an embodiment of UE RA resource allocation, which may be implemented with the LA scheme in UL grant-less RA. In a first implementation option, the UE MCS grouping is obtained by grouping the UEs 320 that share the same MCS. The UEs in a particular MCS grouping access the same resource, e.g., same bandwidth region or same designated Transmission Time Interval (TTI). The RA resources are divided into resource block, each block defined by a frequency and time boundaries. Each resource block can be allocated to serving different MCS groups (e.g., MCS1, MCS2, and MCS3). Each MCS group includes one or more UEs 320. The UEs 320 with same MCS access the same resource region. The resource allocations for the UE MCS groups can be static, semi-static or periodically updated or upon determining that the resource allocation is needed, e.g., based on signal quality, UE mobility, and/or other criteria. Such an allocation scheme can reduce the detection/search complexity. In a second implementation option, the UEs 320 share all the RA resources, e.g., the entire bandwidth or transmission time. In this case, the TPs 310 have the capability to decode mixed MCSs from UEs 320 in different UE MCS groups in a single TTI. Such an allocation scheme can increase resource utilization.

Figure 4:
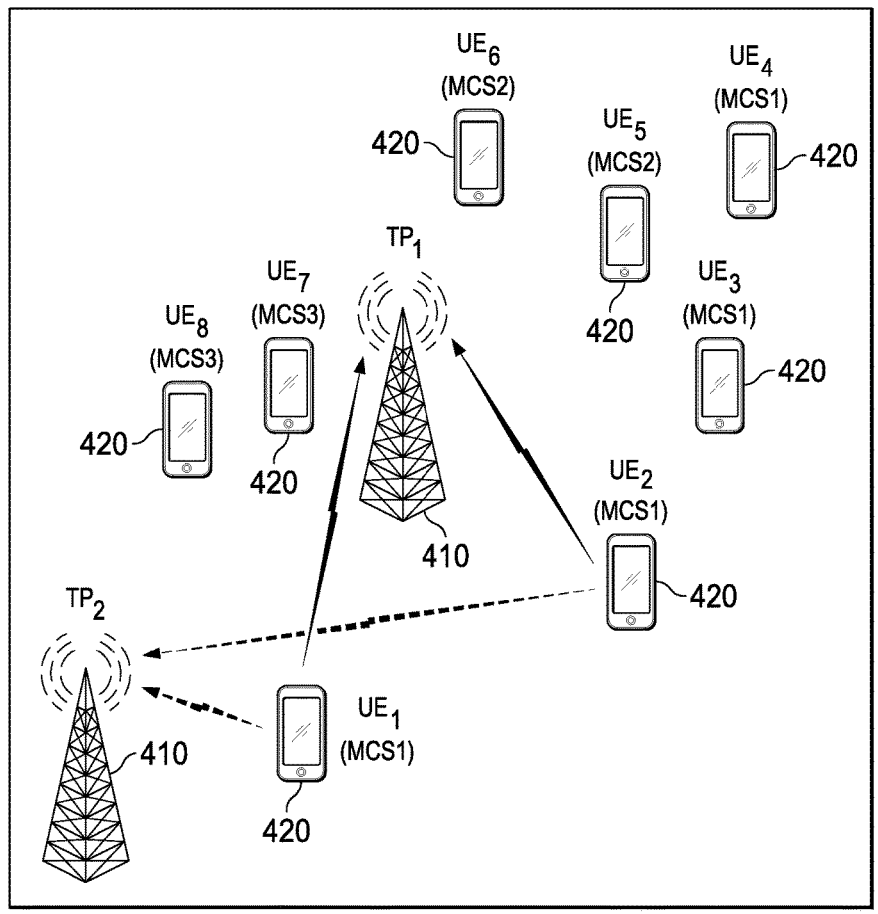
FIG. 4 shows an embodiment of power control (PC) for RA with grant-less scheduling.

FIG. 4 shows an embodiment of PC for RA with grant-less scheduling. The network TPs 410 have knowledge of the location of the UEs, for instance by measuring UE sounding channel. The TPs 410 surrounding the UEs 420 can exchange the LT measurements with each other. For initial access, a UE 420 can notify the network/TP of its maximum transmission power and/or power headroom. UL PC criteria can then be used to perform PC. The criteria include achieving maximum or highest possible MCS while minimizing potential interference. For example, the edge UEs 420, UE1 and UE2, may have different transmission power when applying PC, but the same MCS due to their different interference levels with respect to TP2. Further, different mobility UEs 420 can be assigned different power margins for LA. An additional margin can also be considered for LA due to fast fading channel characteristics. In one PC exemplary implementation given a block error ratio (BLER), a number of assigned resource blocks (RBs), and predefined power offset, $\Delta i$, and CQIi for user i, the highest MCSj is chosen such that Interf(P(MCSj)+$\Delta j$)≤Interf-max and P(MCSj)+$\Delta j$≤Pmax, where P(MCSj) is UE transmission (Tx) power, Pmax is UE maximum Tx power, and Interf-max is the allowable maximum interference to the closest neighbor.

In the first implementation option described above for UE RA resource allocation based on UE MCS grouping, SC can be configured on some TTIs and/or time-frequency resources with a less robust MCS, which may be suitable for sufficiently high signal quality levels for transmission. The configuration can be implemented in a semi-static manner. A retransmission protocol can also be used, where the UE performs the retransmission with the same MCS. The retransmission can be performed with a random back-off time, for the same or different content. After reaching a predefined number of maximum retransmission times, the MCS can be downgraded to a lower (most robust) MCS, which may be suitable for lower or lowest signal quality levels acceptable for transmission. The failed packet is dropped after the retransmissions of the same MCS and the SC retransmissions. There can be one or more retransmission attempts in the SC. According to this ReTx protocol, the TP detects signals in different MCS resource regions. The UEs in each MCS region can be detected separately. The UEs that are not detected in all the MCS region except the most robust MCS (e.g., MCS1) are detected in the SC. Chase combining (CC) or incremental redundancy (IR) can be used in some cases to reduce failed detection signals. If a UE can be detected successfully, the TP can take advantage of it to help detect other UEs. For example, successive interference canceller (SIC) and hybrid automatic repeat request (HARQ) combining is possible. For ReTx, the TP can adjust the MCS and transmission power (and optionally the pilot) for a UE as needed, and send the updates to the UE. The TP can also apply MCS downgrade for failed transmissions.

Figure 5:
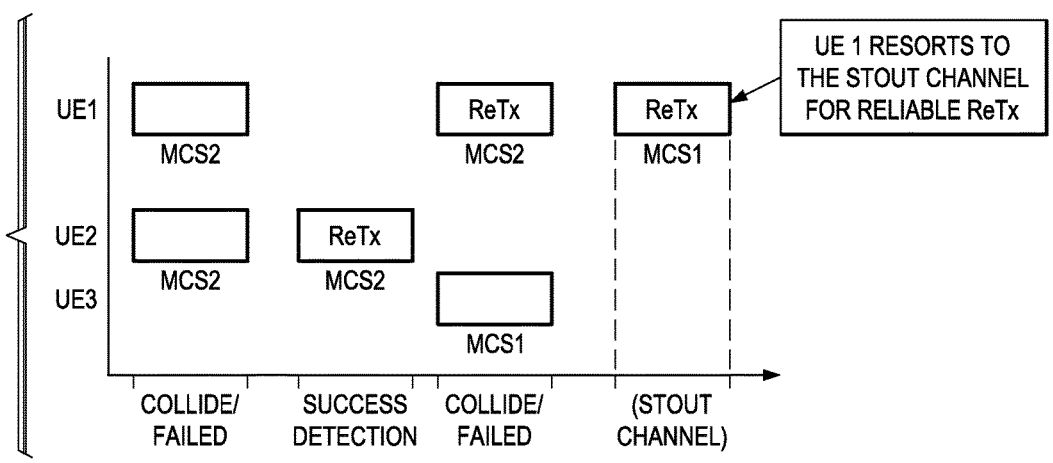
FIG. 5 shows an embodiment of a retransmission protocol for RA with grant-less scheduling.

FIG. 5 shows an embodiment of a ReTx protocol according to second implementation option described above for UE RA resources shared by all UEs. The UE can perform retransmission with the same MCS, as shown for UE1 and UE2 with MCS2. The UE can retransmit in the SC with an indication of its previous failures after it reaches the pre-defined maximum retry times in the original RA resources, as shown for UE1. Also, the UE can retransmit one or more times in the SC. The indication maybe a retransmission indicator or flag. This is to distinguish the data from regular new transmissions. The failed packet is then dropped after all retransmissions. The SC can also be used for new user data transmission. As described above, the TP is able of detecting signals for mixed MCSs. The TP receiver searches for all users. However, in the SC, detection of only the most robust MCS (e.g., MCS1) is needed, as shown for UE1 retransmission. In some cases to reduce failed detection signals, CC or IR can be used. If one UE can be detected successfully, the TP can take advantage of the detected UE to help detect other UEs, for example using SIC and HARQ. The TP can also adjust the MCS, transmission power, and optionally the pilot for a UE on demand, and send updates to the UE. The TP can also apply MCS downgrade for failed transmissions.

Figure 6:
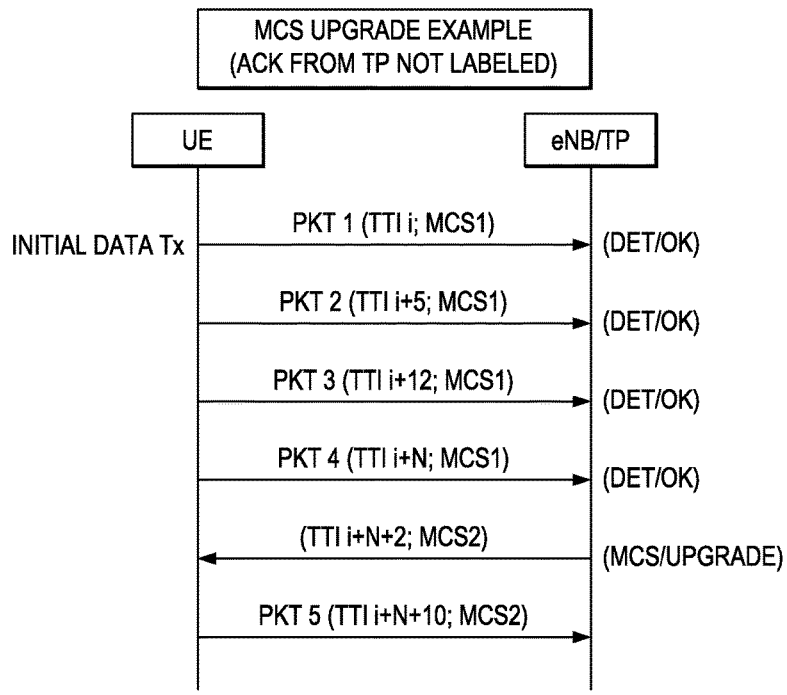
FIG. 6 shows a protocol diagram of an embodiment method for network/TP originated MCS upgrade in RA.

FIG. 6 shows a protocol diagram of an embodiment method for TP originated MCS upgrade in RA. The UE starts by sending an initial data transmission or packet to the TP, e.g., eNB, at a TTI i (where i designates an instance in time units). The UE then sends a second packet at TTI i+5 (5 indicates additional time with respect to i, e.g. 5 seconds), a third packet at TT i+12, and a fourth packet at TTi i+N (N is an integer >12). The packets are sent using a robust MCS (e.g., MCS1). Upon detecting each of the packets successfully, the TP/eNB returns an acknowledgement (ACK) to the UE (not shown). After a number of successive packets are detected successfully (e.g. 4 in the illustrated example), the TP/eNB may determine that the signaling conditions for the UE are above a threshold and based on that determination, the TP can upgrade the MCS to improve efficiency (as shown for the transmission at TTI i+N+2). The MCS upgrade decision may be made by TP upon satisfying predefined good signal condition criteria. These criteria, which may include factors such as receiving successfully a predefined number of subsequent packets, may be determined on a UE to UE basis, so that only UEs demonstrating the sufficiently reliable channels are impacted. As illustrated in FIG. 6, after being informed of the MCS upgrade, the UE can send a fifth transmission using the upgraded MCS (e.g., MCS2).

Figure 7:
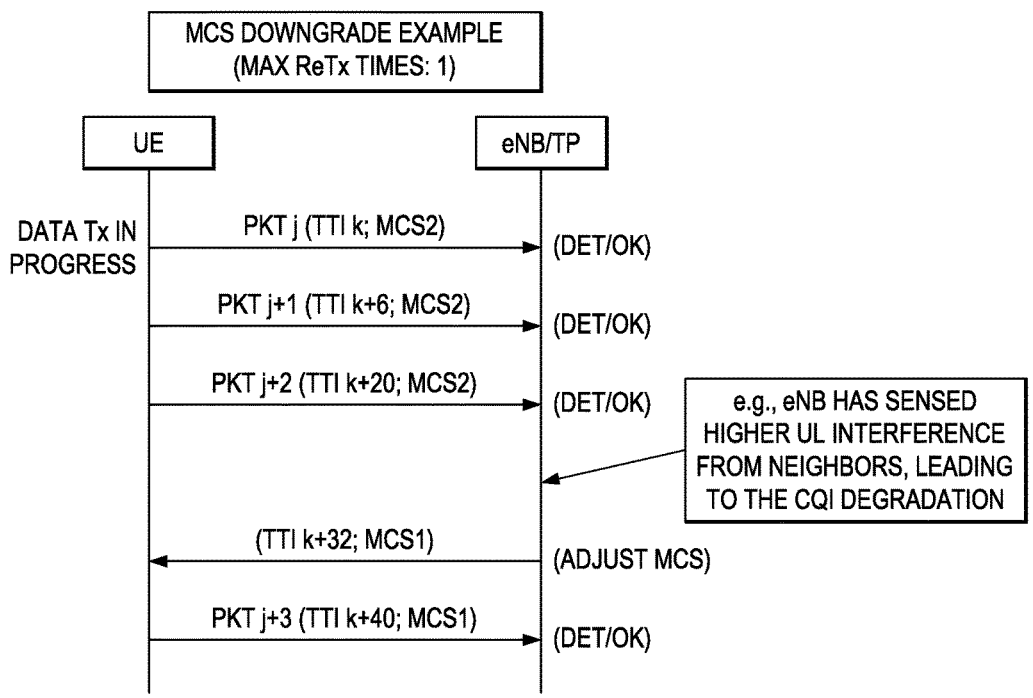
FIG. 7 shows a protocol diagram of an embodiment method for network/TP originated MCS downgrade in RA.

FIG. 7 shows a protocol diagram of another embodiment method for execution at a TP for a TP originated MCS downgrade in RA. The UE sends a data transmission (illustrated as packet j) to the TP, e.g., eNB, at a TTI k (where k designates an instance in time units) using MCS2. This transmission is successfully detected by the TP/eNB. The UE then sends a second packet j+1 at TTI k+6 (e.g. 6 seconds after time instance k) using the same MCS2, and a third packet j+2 at TTI k+20 using the same MCS2, which are both successfully detected at the TP/eNB. Nothing in the transmissions from the UE necessarily indicates that a change in the MCS is warranted. However, after receiving a number of transmissions successfully with MCS2, the TP/eNB detects a higher UL interference from any UE within proximity or detection range of the TP/eNB, which leads to channel quality degradation. In response, the TP/eNB decides to preemptively downgrade the MCS used by the UE to MCS1 to avoid transmission problems. The TP sends the MCS downgrade instruction to the UE at TTI k+32. Next, the UE sends a new packet j+3 at TTI k+40 using the more robust MCS1.

Figure 8:
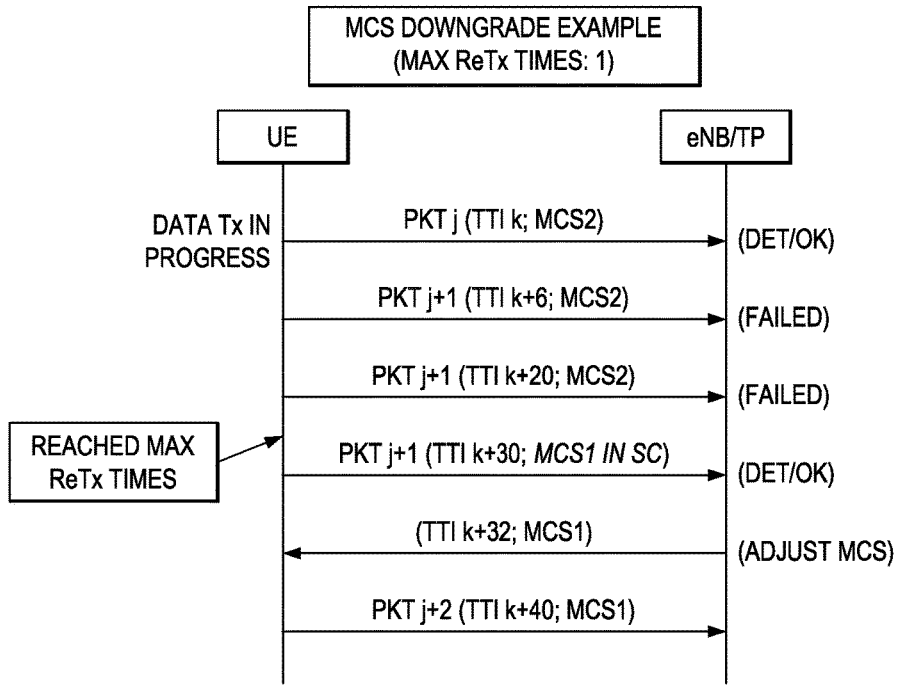
FIG. 8 shows a protocol diagram of another embodiment method for UE originated MCS downgrade in RA.

FIG. 8 shows a protocol diagram of an embodiment method for a UE originated MCS downgrade in RA. As illustrated. The UE sends a data transmission (packet j) to the TP, e.g., eNB, at a TTI k using MCS2. This transmission is successfully detected by the TP/eNB. The UE then sends a second packet j+1 at TTI k+6 (e.g. 6 seconds after time instance k) using the same MCS2. When this transmission fails, e.g., the UE does not receive an ACK response from the TP/eNB, the UE retransmits packet j+1 at TTI k+20 using MCS2. When this retransmission fails, again the UE does not receive an ACK from the TP. The lack of ACK allows the UE to determine that the transmission is unsuccessful. Upon reaching a predefined number of failed retransmissions, the UE changes the MCS to MCS1 and retransmits packet j+1 at TTI k+30 using SC with MCS1. MCS1 is more robust than MCS2. Retransmitting the packet on the SC with MCS1, which is a more robust channel than MCS2 or a most robust MCS, serves to trigger the MCS downgrade and indicates a request of the downgrade to the TP/eNB or network. Upon detecting this retransmission in the SC (with MCS1 by default), the TP/eNB downgrades the MCS for the UE from MCS2 to MCS1 and sends an ACK back to the UE (not shown). A downgrade instruction (or confirmation as the case may be) is thus sent to the UE at TTI k+32. The UE sends a new packet j+2 at TTI k+40 using MCS1.

Figure 9:
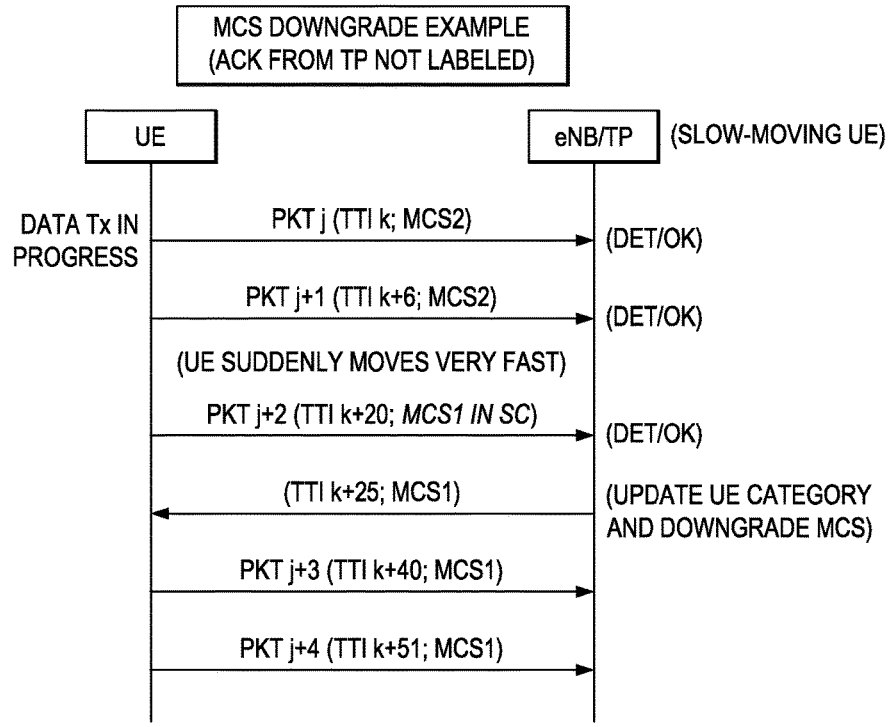
FIG. 9 shows a protocol diagram of another embodiment method for UE originated MCS downgrade in RA.

FIG. 9 shows a protocol diagram of another embodiment method for UE originated MCS downgrade in RA. The UE sends a data transmission (packet j) to the TP, e.g., eNB, at a TTI k using MCS2, which is successfully detected by the TP/eNB. The UE subsequently sends a second packet j+1 at TTI k+6 using the same MCS2, which is also successfully detected by the TP/eNB. The UE mobility then changes its mobility state. In the illustrated embodiment, a slow moving UE transitions to a fast movement state. The UE is aware of its change in mobility and network entities may not yet be aware of this change. The UE transmits the next packet j+2 at TTI k+20 in the SC with the MCS1, which as discussed above can represent the most robust MCS available. Transmitting the packet on the SC with MCS1 serves to trigger the MCS downgrade and indicates a request for the downgrade to the TP/eNB or network. Upon receiving packet j+2 at the TP/eNB in the SC with MCS1, the TP/eNB is informed of the change in UE mobility or signal condition, and hence updates the UE category and downgrades its MCS. A downgrade instruction can be sent to the UE. The UE can treat this as an acceptance of the request to move to MCS1. When the UE transmits packet j+3 at TTI k+40 it does so using MCS1. The UE will continue transmitting using MCS, as shown by the transmission packet j+4 at TTI k+51, until a MCS upgrade is triggered, typically by the TP or other network entity.

In other embodiments, a UE can initiate an MCS downgrade after detecting a LA condition associated with the UE transmission qualities and application QoS. For instance, the UE downgrades the MCS when more reliable transmission is needed for a traffic application. In an example, the UE initiates the MCS downgrade upon determining a quality of service (QoS) requirement for an application of the UE that requires a more robust MCS.

In further embodiments, one of the entities participating in the grant free wireless communication uses a Modulation and Coding Scheme (MCS) to transmit data. The node may be a UE or a TP that initiates a change in MCS based on a non-link factor. For instance, the non-link factor can be the determination of mobility (move) or change in mobility of the UE, a launch of an application of the UE, a foreknowledge of an expected or likely change in channel characteristics, or other factors that require change of MCS, e.g., to a more robust MCS, that may not be associated with link conditions between the UE and TP. When the node (UE or TP) determines according to the non-link based factor that a new MCS should be used in place of a current MCS (e.g., the new MCS is more robust than the current MCS), the node instructs a grant free transmission controller to use the new MCS for subsequent grant free transmissions. In the case of UE initiated MCS change, the instructed grant free transmission controller may be a local controller at the UE. In the case of TP initiated MCS change, the instruction can be sent from the TP to a UE controller.

Figure 10:
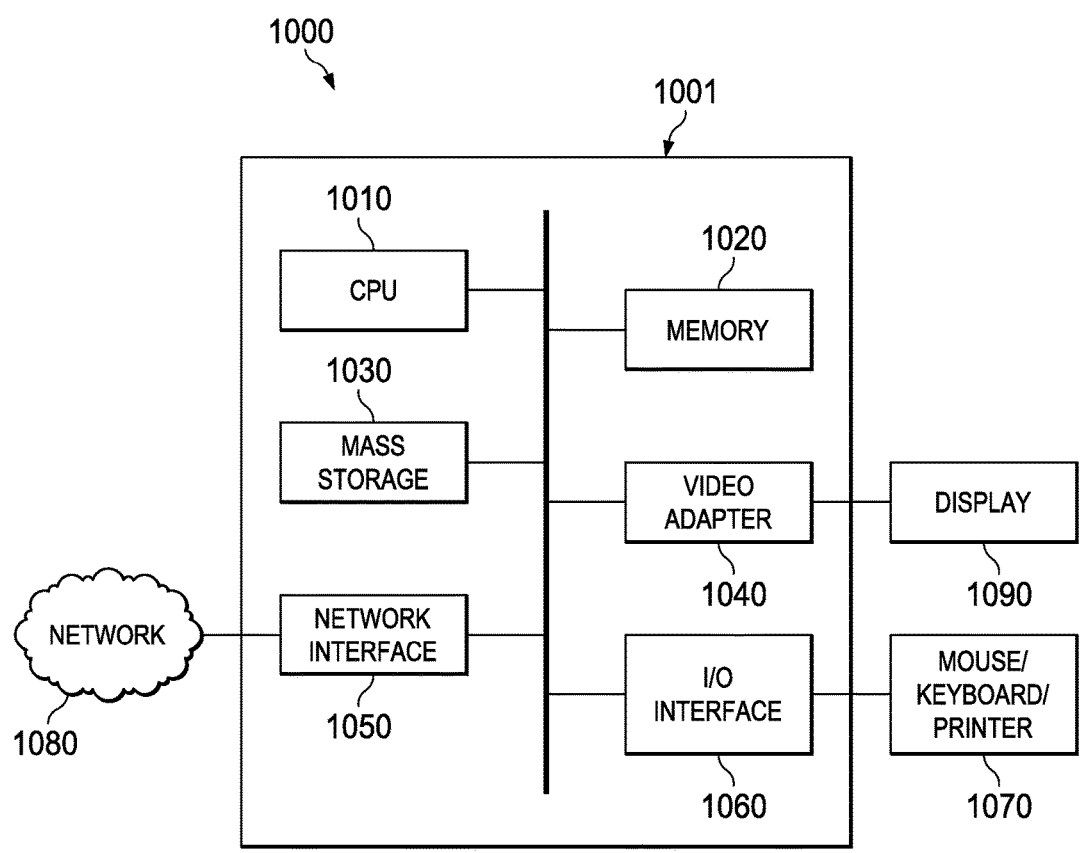
FIG. 10 is a diagram of a processing system that can be used to implement various embodiments.

FIG. 10 is a block diagram of a processing system 1000 that can be used to implement various embodiments. The processing system 1000 can be part of a TP or eNB, a UE, or other network devices. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 1000 may comprise a processing unit 1001 equipped with one or more input/output devices, such as a speaker, microphone, mouse, touchscreen, keypad, keyboard, printer, display, and the like. The processing unit 1001 may include a central processing unit (CPU) 1010, a memory 1020, a mass storage device 1030, a video adapter 1040, and an I/O interface 1060 connected to a bus. The bus may be one or more of any type of several bus architectures including a memory bus or memory controller, a peripheral bus, a video bus, or the like.

The CPU 1010 may comprise any type of electronic data processor. The memory 1020 may comprise any type of system memory such as static random access memory (SRAM), dynamic random access memory (DRAM), synchronous DRAM (SDRAM), read-only memory (ROM), a combination thereof, or the like. In an embodiment, the memory 1020 may include ROM for use at boot-up, and DRAM for program and data storage for use while executing programs. In embodiments, the memory 1020 is non-transitory. The mass storage device 1030 may comprise any type of storage device configured to store data, programs, and other information and to make the data, programs, and other information accessible via the bus. The mass storage device 1030 may comprise, for example, one or more of a solid state drive, hard disk drive, a magnetic disk drive, an optical disk drive, or the like.

The video adapter 1040 and the I/O interface 1060 provide interfaces to couple external input and output devices to the processing unit. As illustrated, examples of input and output devices include a display 1090 coupled to the video adapter 1040 and any combination of mouse/keyboard/printer 1070 coupled to the I/O interface 1060. Other devices may be coupled to the processing unit 1001, and additional or fewer interface cards may be utilized. For example, a serial interface card (not shown) may be used to provide a serial interface for a printer.

The processing unit 1001 also includes one or more network interfaces 1050, which may comprise wired links, such as an Ethernet cable or the like, and/or wireless links to access nodes or one or more networks 1080. The network interface 1050 allows the processing unit 1001 to communicate with remote units via the networks 1080. For example, the network interface 1050 may provide wireless communication via one or more transmitters/transmit antennas and one or more receivers/receive antennas. In an embodiment, the processing unit 1001 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for link adaptation in wireless networks, the method comprising:
   receiving, by a transmission point (TP) from a user equipment (UE) in a first grant-less transmission, a first packet using a first modulation and coding scheme (MCS);
   after receiving the first packet, signaling, by the TP to the UE, an indication to change from the first MCS to a second MCS determined by the TP for future grant-less transmissions by the UE; and
   receiving, by the TP from the UE in a second grant-less transmission, a second packet encoded using the second MCS different from the first MCS.

2. The method of claim 1 further comprising categorizing the UE into a MCS group based on measurements of an uplink Long Term (LT) channel signal quality of a channel associated with the UE, upon receiving the first packet and one or more subsequent packets or control signals.

3. The method of claim 1 further comprising:
   measuring a signal quality of an uplink channel associated with the UE, wherein the indication to change from the first MCS to the second MCS signaled by the TP to the UE is in accordance with the measured signal quality.

4. The method of claim 1 further comprising:
   measuring a surrounding interference level, wherein the indication to change from the first MCS to the second MCS signaled by the TP to the UE comprises an instruction to perform one of an upgrade of the first MCS upon detecting an improvement in the surrounding interference level, or a downgrade of the first MCS upon detecting a degradation in the surrounding interference level.

5. The method of claim 4, further comprising the TP sending the instruction via radio resource control (RRC) signaling.

6. The method of claim 1 further comprising:
   determining a mobility of the UE, wherein the indication to change from the first MCS to the second MCS signaled by the TP to the UE comprises an instruction to perform one of an upgrade of the first MCS upon detecting a decrease in the mobility, or a downgrade of the first MCS upon detecting an increase in the mobility.

7. The method of claim 1 further comprising detecting a link adaptation (LA) condition associated with uplink long-term (LT) channel signal quality measurements of the UE upon receiving the first packet.

8. The method of claim 7 further comprising performing power control (PC) of transmissions of the UE in accordance with the LA condition.

9. The method of claim 7 further comprising performing pilot adjustment of the UE in accordance with the LA condition.

10. The method of claim 1 further comprising, categorizing the UE in one of a first group of LA-enabled UEs with varying MCS, or a second group of fixed MCS UEs, wherein the UE is categorized in the first group or in the second group in accordance with a mobility of the UE.

11. The method of claim 10 further comprising:
    repeating detecting LA conditions associated with uplink LT channel signal quality measurements of the UE over time; and
    updating the categorizing of the UE in accordance with the LA conditions.

12. The method of claim 1 further comprising:
    establishing a look-up table (LUT) associating a plurality of supported MCSs with a plurality of predetermined channel quality indicator (CQI) values; and
    measuring a CQI for an uplink channel associated with the UE, wherein the indication to change from the first MCS to the second MCS signaled by the TP to the UE comprises assigning to the UE one of the plurality of supported MCSs that matches the CQI of the UE in the LUT.

13. The method of claim 1 further comprising:
    grouping a plurality of UEs into a plurality of UE MCS groups;
    assigning to the plurality of UE MCS groups a plurality of corresponding MCSs;
    allocating to the plurality of UE MCS groups a plurality of corresponding resource regions, wherein the corresponding resource regions are bandwidth regions or Transmission Time Intervals (TTIs);

signaling the UEs in the plurality of UE MCS groups the corresponding resource regions; and receiving, from the UEs in the plurality of UE MCS groups, a plurality of packets encoded using the plurality of corresponding MCSs within the corresponding resource regions.

14. The method of claim 1 further comprising detecting, from a plurality of UEs, a plurality of packets encoded using different MCSs within a single Transmission Time Interval (TTI) and bandwidth.

15. The method of claim 1 further comprising:
selecting the second MCS by the TP, wherein the indication to change from the first MCS to the second MCS comprises an instruction to use the second MCS.

16. The method of claim 15 further comprising, after transmitting the instruction, receiving, from the UE, a third packet encoded using the second MCS.

17. The method of claim 15, further comprising the TP transmitting the instruction via radio resource control (RRC) signaling.

18. The method of claim 1, wherein the second packet is a retransmission of the first packet, and wherein the second MCS is a pre-assigned most robust MCS corresponding to a stout channel.

19. The method of claim 1, further comprising, prior to receiving the first packet, providing time-frequency resource allocation information to the UE.

20. The method of claim 1, further comprising sending, to the UE, an update of a new MCS, a transmission power, or a pilot reselection.

21. The method of claim 20, sending the update comprising sending the update via radio resource control (RRC) signaling.

22. The method of claim 1, further comprising receiving, from the UE, an indication for the TP to adjust an MCS scheme of the UE.

23. The method of claim 1, wherein the signaling comprises:
signaling the indication based on receiving the first packet.

24. The method of claim 1, further comprising:
before the signaling, determining, by the TP, a second MCS based on receiving the first packet.

25. A method for link adaptation in a wireless network, the method comprising:
transmitting, by a user equipment (UE) to a transmission point (TP) in a first grant-less transmission, a first packet encoded using a first modulation and coding scheme (MCS) pre-assigned for the UE;
after transmitting the first packet, receiving, by the UE, an indication to change from the first MCS to a second MCS determined by the TP for future grant-less transmissions by the UE; and
transmitting, by the UE to the TP in a second grant-less transmission, a second packet encoded using the second MCS.

26. The method of claim 25 further comprising retransmitting the first packet to the TP on a stout channel (SC) using a pre-assigned most robust MCS, before receiving the indication from the TP.

27. The method of claim 25 further comprising repeating the transmitting of the first packet to the TP until reaching a predefined maximum number of repeated transmissions of the first packet to the TP.

28. The method of claim 25 further comprising:
detecting, by the UE, an increase in mobility of the UE; and initiating a downgrade of the first MCS to the second MCS in response to the increase in the mobility of the UE.

29. The method of claim 25 further comprising:
determining a quality of service (QoS) requirement for an application of the UE requiring a more robust MCS than the first MCS; and
initiating a downgrade of the first MCS to the second MCS in response to the QoS requirement for the application.

30. The method of claim 25, further comprising transmitting, to the TP, an indication for the TP to adjust an MCS scheme of the UE.

31. The method of claim 25, further comprising, receiving, by the UE, a link adaptation (LA) condition associated with UE transmission or application quality, wherein the LA condition comprises one or more of a long-term link quality measurement, a mobility of the UE, or a quality of service (QoS) requirement for an application of the UE.

32. The method of claim 25, wherein the second packet is a retransmission of the first packet, and wherein the second MCS is a pre-assigned most robust MCS corresponding to a stout channel.

33. The method of claim 25, further comprising, prior to transmitting the first packet, receiving time-frequency resource allocation information from the TP.

34. The method of claim 25, further comprising receiving, from the TP, an update of a new MCS, a transmission power, or a pilot reselection.

35. The method of claim 34, receiving the update comprising receiving the update via radio resource control (RRC) signaling.

36. A network component supporting link adaptation and comprising:
at least one processor; and
a non-transitory computer readable storage medium storing programming for execution by the at least one processor, the programming including instructions for:
receiving, by the network component from a user equipment (UE) in a first grant-less transmission, a first packet using a first modulation and coding scheme (MCS);
after receiving the first packet, signaling, by the network component to the UE, an indication to change from the first MCS to a second MCS determined by the network component for future grant-less transmissions by the UE; and
receiving, by the network component from the UE in a second grant-less transmission, a second packet encoded using the second MCS different from the first MCS.

37. The network component of claim 36 wherein the programming further comprises instructions for, after transmitting the instruction, receiving, from the UE, a third packet encoded using a third MCS.

38. The network component of claim 36 further comprising instructions for categorizing the UE into a MCS group based on measurements of an uplink Long Term (LT) channel signal quality of a channel associated with the UE, upon receiving the first packet and one or more subsequent packets or control signals.

39. The network component of claim 36 further comprising instructions for detecting a link adaptation (LA) condition associated with uplink long-term (LT) channel signal quality measurements of the UE upon receiving the first packet, wherein the instructions to detect the LA condition include instructions to detect that the first packet is received in a stout channel (SC), and wherein the first MCS is downgraded to the second MCS in accordance with detecting the first packet is received in the SC.

40. The network component of claim 36, wherein the programming further includes instructions for:
measuring a signal quality of an uplink channel associated with the UE, wherein the indication to change from the first MCS to the second MCS signaled by the network component to the UE is in accordance with the measured signal quality.

41. The network component of claim 36, wherein the programming further includes instructions for:
selecting the second MCS; and
after receiving the second packet, transmitting, by the network component, an instruction to use the second MCS to the UE.

42. A user equipment (UE) supporting link adaptation and comprising:
at least one processor; and
a non-transitory computer readable storage medium storing programming for execution by the at least one processor, the programming including instructions for:
transmitting, by the UE to a transmission point (TP) in a first grant-less transmission, a first packet encoded using a first modulation and coding scheme (MCS) pre-assigned for the UE;
after transmitting the first packet, receiving, at the UE, an indication to change from the first MCS to a second MCS determined by the TP for future grant-less transmissions by the UE; and
transmitting, by the UE to the TP in a second grant-less transmission, a second packet encoded using the second MCS.

43. The UE of claim 42 further comprising instructions for retransmitting the first packet to the TP on a stout channel (SC) using a pre-assigned most robust MCS, before receiving the instruction from the TP.

44. The UE of claim 42 further comprising instructions for repeating the transmitting of the first packet to the TP until reaching a predefined maximum number of repeated transmissions of the first packet to the TP.

45. A method for execution at a User Equipment (UE), the method comprising:
transmitting, by the UE to a transmission point (TP), a first grant-less transmission encoded using a first modulation and coding scheme (MCS) to the TP;
after transmitting the first grant-less transmission, transmitting, by the UE to the TP, a second grant-less transmission encoded using a second MCS different from the first MCS; and
after the transmitting the second grant-less transmission, receiving, from the TP, an instruction to transmit subsequent grant-less transmissions using the second MCS determined by the TP.

46. The method of claim 45 further comprising:
determining, prior to transmitting the second grant-less transmission, that the subsequent transmissions should be encoded using the second MCS; and
in accordance with the determination, selecting the second MCS.

47. The method of claim 45 further comprising:
detecting an increase in mobility of the UE; and
initiating a downgrade of the first MCS to the second MCS in response to the increase in the mobility of the UE.

48. The method of claim 45 further comprising:
determining a quality of service (QoS) requirement for an application of the UE requiring a more robust MCS than the first MCS; and
initiating a downgrade of the first MCS to the second MCS in response to the QoS requirement for the application.

49. A method for link adaptation in wireless networks, the method comprising:
establishing, for grant-less uplink transmissions, a look-up table (LUT) associating a plurality of modulation and coding schemes (MCSs) with a plurality of predetermined channel quality indicator (CQI) values;
measuring, by a transmission point (TP), a CQI for an uplink channel associated with a user equipment (UE);
assigning, by the TP to the UE, an MCS of the plurality of MCSs, the assigned MCS matching the CQI of the UE in the LUT and for uplink (UL) transmissions by the UE; and
receiving, by the TP from the UE, a first packet encoded using the MCS assigned to the UE.

50. The method of claim 49, further comprising signaling, via Radio Resource Control (RRC), the MCS assigned to the UE.

51. A user equipment (UE) supporting link adaptation and comprising:
at least one processor; and
a non-transitory computer readable storage medium storing programming for execution by the at least one processor, the programming including instructions for:
transmitting, by the UE to a transmission point (TP), a first grant-less transmission encoded using a first modulation and coding scheme (MCS) to the TP;
after transmitting the first grant-less transmission, transmitting, by the UE to the TP, a second grant-less transmission encoded using a second MCS different from the first MCS; and
after the transmitting the second grant-less transmission, receiving, from the TP, an instruction to transmit subsequent transmissions using the second MCS determined by the TP.

52. The UE of claim 51 further comprising instructions for:
detecting an increase in mobility of the UE; and
initiating a downgrade of the first MCS to the second MCS in response to the increase in the mobility of the UE.

53. The UE of claim 51 further comprising instructions for:
determining a quality of service (QoS) requirement for an application of the UE requiring a more robust MCS than the first MCS; and
initiating a downgrade of the first MCS to the second MCS in response to the QoS requirement for the application.

* * * * *